United States Patent

Nakano

[19]

[11] Patent Number: 5,897,096
[45] Date of Patent: Apr. 27, 1999

[54] SOLENOID VALVE APPARATUS

[75] Inventor: Yuji Nakano, Toyota, Japan

[73] Assignee: Denso Corporation, Kariya, Japan

[21] Appl. No.: 08/863,006

[22] Filed: May 23, 1997

[30] Foreign Application Priority Data

May 27, 1996 [JP] Japan .................................. 8-132235
Apr. 1, 1997 [JP] Japan .................................. 9-083054

[51] Int. Cl.[6] .................................................. F16K 31/06
[52] U.S. Cl. ...................................... 251/65; 251/129.15
[58] Field of Search ............................... 251/65, 129.02, 251/129.15, 129.18

[56] References Cited

U.S. PATENT DOCUMENTS

| 4,251,052 | 2/1981 | Hertfelder et al. ................. 251/129.02 |
| 4,426,988 | 1/1984 | Ito et al. . |
| 4,512,546 | 4/1985 | Inada et al. ............................... 251/65 |
| 5,029,807 | 7/1991 | Fuchs ........................................ 251/65 |
| 5,094,218 | 3/1992 | Everingham et al. ................. 251/65 X |
| 5,113,896 | 5/1992 | Tortellier ........................ 251/129.15 X |
| 5,217,200 | 6/1993 | Hutchings et al. ................... 251/65 X |
| 5,259,416 | 11/1993 | Kunz et al. ............................ 251/65 X |
| 5,277,399 | 1/1994 | McCabe ............................. 251/129.18 |
| 5,787,915 | 8/1998 | Byers et al. ........................... 251/65 X |

FOREIGN PATENT DOCUMENTS 63-1975  1/1988  Japan .
5-332322  12/1993  Japan .

*Primary Examiner*—Kevin Lee
*Attorney, Agent, or Firm*—Pillsbury Madison & Sutro LLP

[57] ABSTRACT

A solenoid valve has a biasing member for generating biasing force and a permanent magnet for generating magnetic force. When both the biasing force and the magnetic force act on a movable member, the direction of the biasing force opposes the direction of the magnetic force. Therefore, the position of the movable member is determined based on the balance between the biasing force and the magnetic force. As a result, even when the solenoid coil is not excited, a valve member moving together with the movable member stays apart from the valve seat by a predetermined distance to maintain an open fluid channel.

14 Claims, 4 Drawing Sheets

SOLENOID VALVE APPARATUS

CROSS REFERENCE TO RELATED APPLICATION

This application is based upon and claims priority from Japanese Patent Applications No. Hei. 8-132235 filed May 27, 1996 and No. Hei. 9-83054 filed Apr. 1, 1997, the contents of which are incorporated herein by reference.

BACKGROUND OF THE INVENTION

1. Field of the Invention

The present invention relates to a solenoid valve apparatus which opens or closes a fluid channel.

2. Related Art

Conventionally, it has been known that a solenoid valve is used as an idle-speed control valve (hereinafter, referred to as ISC valve) for controlling the flow rate of intake air flowing through an intake air bypass when an engine is idling. The solenoid valve used as the ISC valve closes the intake air bypass when a valve member as a movable member is biased by the biasing force of a spring in a direction of a valve closing position during non-excitation of a coil. On the other hand, the intake air bypass is opened when the coil is excited and electromagnetic force generated by the coil attracts the valve member against the elastic force of the spring.

In the ISC valve utilizing the solenoid valve having the structure as described above, however, if a current providing source providing current to the coil has failed or breaking of the coil or the like has occured, because the coil does not generate the electromagnetic force to attract the valve member in the direction of the valve closing position, the ISC valve remains, closing the intake air bypass. When the ISC valve closes the intake air bypass, flow rate of intake air introduced to an engine becomes zero at the time of an idling operation of the engine. As a result, there arises a problem that the engine stops. In accompaniment to the engine stop, a power steering apparatus driven by power from the engine does not operate, either. Therefore, for the sake of a fail-safe to prevent the engine stop at the time of the idling operation of the engine, even if the coil cannot be excited due to failure of the current providing source, breaking of the coil or the like, a predetermined flow rate of air must be introduced into the engine by causing the ISC valve to open.

SUMMARY OF THE INVENTION

The present invention has been made in view of such problems, and its object is to provide a solenoid valve apparatus which can allow a predetermined flow rate of fluid to flow therethrough even when a coil is not excited due to breaking thereof or the like.

The solenoid valve apparatus according to the present invention has a biasing member for generating biasing force and a permanent magnet for generating magnetic force. While both the biasing force of the biasing member and the magnetic force of the permanent magnet act on a movable member, a direction of the biasing force opposes a direction of the magnetic force. Therefore, a position of the movable member is determined based on the balance of the biasing force of the biasing member and the magnetic force of the permanent magnet. As a result, even when the coil is not excited, a valve member moving together with the movable member stays apart from a valve seat by a predetermined distance to open a fluid channel. Consequently, if breaking of the coil or the like has occurred, the valve member can be prevented from contacting the valve seat, and so a predetermined flow rate of fluid can flow through the fluid channel.

In addition, the solenoid valve apparatus is provided with a current supplying circuit which can supply current to the coil in two ways. When current is supplied to the coil in one way so that the coil generates magnetic flux running in the same direction as magnetic flux of the permanent magnet, the movable member is attracted on a stationary member side by a composite magnetic force due to the permanent magnet and the coil. Conversely, when current is supplied to the coil in the other way so that the coil generates magnetic flux running in the opposing direction to magnetic flux of the permanent magnet, the movable member moves further apart from the stationary member because magnetic flux of the permanent magnet is reduced by magnetic flux of the coil. Therefore, the valve member can be moved from a closing position making contact with the valve seat to a maximum opening position allowing a maximum flow rate of fluid to flow. In other words, by controlling current supplied to the coil, not only flow rate of fluid flowing through the fluid channel can be controlled, but also the fluid channel can be closed by the valve member and the valve seat.

The permanent magnet is preferably disposed in not the movable member but the stationary member. As a result, because the movable member can be lightened, response of the movable member is enhanced so that control for the flow rate of fluid can be accurately performed.

Further, the solenoid valve may be provided with an adjusting the device which is capable of adjusting biasing force due to the biasing member. In this case, a distance between the valve member and valve seat during non-excitation of the coil can be easily changed.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

PREFERRED EMBODIMENTS OF THE INVENTION

Preferred embodiments of the present invention will be described with reference to the drawings.

(First Embodiment)

Figure 1:
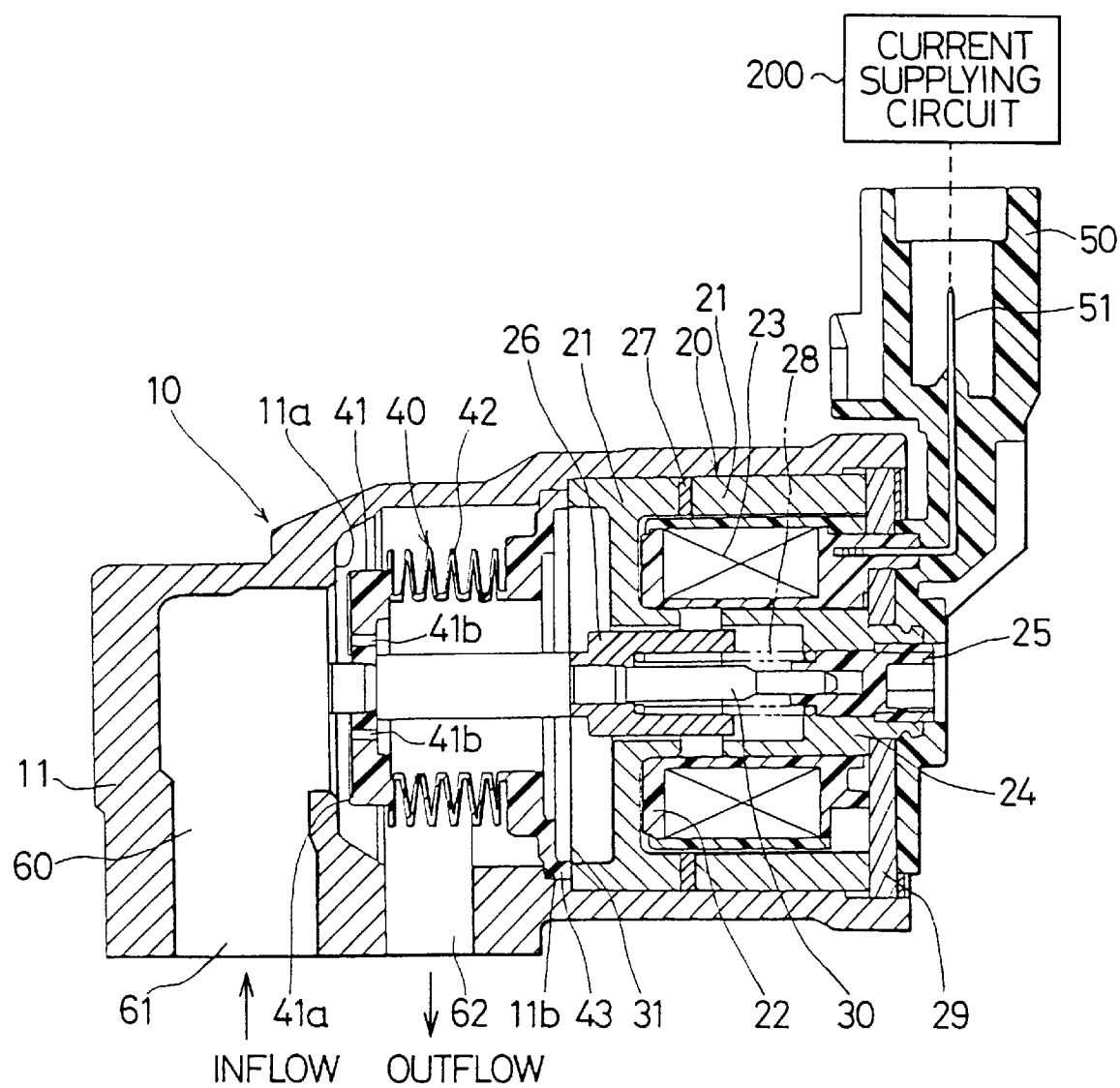
FIG. 1 is a sectional view illustrating a solenoid valve according to a first embodiment of the present invention, the solenoid valve being applied to an ISC valve.

FIG. 1 shows a solenoid valve applied to an ISC valve according to the first embodiment of the present invention.

ISC valve 10 is used for control of an idling rotational speed of an engine, that is, it controls flow rate of intake air which bypasses a throttle valve (not shown) during an idling operation of the engine. An air channel 60 is formed in a housing 11 of ISC valve 10. A cross section of air channel 60 has an inverted U-shape. One end of air channel 60 is an inflow port 61 and the other end thereof is an outflow port 62. A seat member 11a to which valve member 41 described later can contact is formed between inflow port 61 and outflow port 62 of air channel 60.

An electromagnetic actuator 20 of a direct-acting type has a cylindrical yoke 21. Cylindrical yoke 21 houses a coil 23 which is wound around a bobbin 22 and is composed of a single coil. A stationary core 24 is disposed on an inner peripheral surface of bobbin 22. An adjusting screw 25 is screwed into stationary core 24 to adjust biasing force of a spring 28 as a biasing member, which is described later. A movable core 26 is disposed in stationary core 24 to be able to move back and forth. A permanent magnet 27 is buried in yoke 21. A disk-like plate 29 is provided to cover one side face of yoke 21.

Magnetic flux generated by permanent magnet 27 acts movable core 26 to attract movable core 26 toward stationary core 24.

Yoke 21, stationary core 24 and plate 29 composing a stationary member are formed from magnetic material such as iron and constitute a stationary magnetic circuit.

Movable core 26 formed from magnetic material such as iron is press-fitted to a shaft 30 which will be described later and is inserted in a hollow portion of yoke 21. Movable core 26 and shaft 30 compose a movable member. Movable core 26 is biased by spring 28 in a direction of moving farther apart from stationary core 24, that is, in a direction such that valve member 41 closes air channel 60. When a current supplying circuit 200 does not supply current to coil 23, movable core 26 is held at a lift position shown in FIG. 1, due to the balance of the magnetic force of permanent magnet 27 and the biasing force of spring 28. When the biasing force of spring 28 is adjusted by changing an amount of screwing of adjusting screw 26, the lift position of movable core 26 can be easily controlled.

When current supplying circuit 200 conducts current in coil 23 in a direction such as that coil 23 generates magnetic flux running in the same direction as that of magnetic flux generated by permanent magnet 27, movable core 26 is attracted toward stationary core 24 against the biasing force of spring 28 by magnetic force generated by coil 23. Current from current supplying circuit 200 is supplied to coil 23 through a terminal 51 molded in a connector 50.

One end portion of shaft 30 is inserted into a recess portion of adjusting screw 25 to slide on an inner wall of the recess portion of adjusting screw 25. The other end portion of shaft 30 is fixed to a bellows 40. A central portion of shaft 30 is supported by a plate spring 31 to perform the centering of shaft 30. A peripheral portion of plate spring 31 is put between bellows 40 and yoke 21. Shaft 30 moves back and forth together with movable core 26 and valve member 41 of bellows 40.

Bellows 40 is composed of valve member 41, bellows portion 42 and a flange member 43 made from, for example, ethylene tetrafluoride. A peripheral portion of flange member 43 of Bellows 40 is put along with plate spring 31 between yoke 21 and a stepped portion 11b formed in an inner wall of housing 11. A contact portion 41a of valve member 41 is capable of making contact with a seat portion 11a formed in the inner wall of housing 11. The inside of bellows 40 and an inflow port side of air channel 60 are communicated by through holes 41b formed in valve member 41. As a result, because differential pressure between the inside of bellows 40 and the inflow port side of air channel 60 can be cancelled due to through holes 41b, force applied to valve member 41 by pressure difference of inflow air and outflow air can be also cancelled.

Next, operation of ISC valve 10 will be described.

Figure 2A:
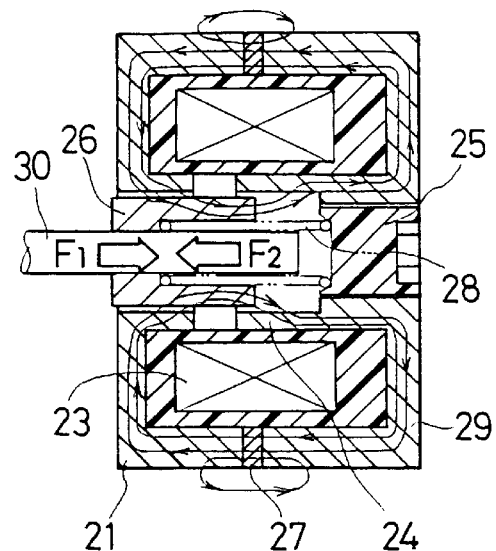
FIG. 2A is a partly sectional view illustrating the state of the solenoid valve when a coil is not excited.

As shown in FIG. 2A, magnetic flux from permanent magnet 27 flows in the magnetic circuit constituted by yoke 21, movable core 26, stationary core 24 and plate 29 during non-excitation of coil 23. As a result, movable core 26 is hold at a position shown in FIG. 1 due to balance of attraction force (magnetic force) F1 heading for a stationary core 24 side, which is generated by magnetic flux flowing through the magnetic circuit, and biasing force which is given by spring 28 so as to move movable core 26 further apart from stationary core 24. At this time, contact portion 41a separates from seat portion 11a. Therefore, air flows in air channel 60 from inflow port 61 to outflow port 62 via a clearance between contact portion 41a and seat portion 11a during non-excitation of coil 23. As a result, even when coil 23 cannot generate magnetic flux due to the failure of current supplying circuit 200, breaking of coil 23 or the like, it is possible to supply intake air to the engine and thereby to prevent stoppage of the engine.

Figure 2B:
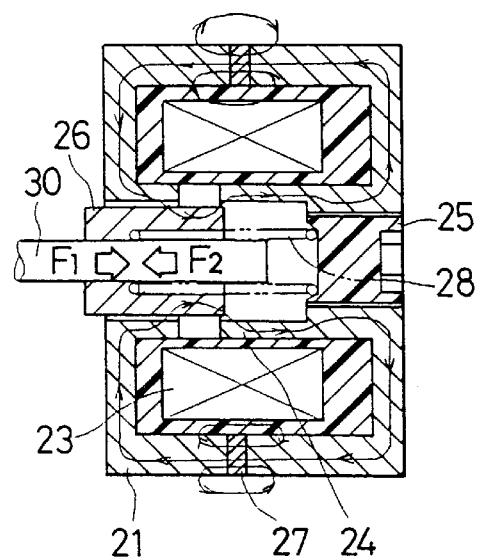
FIG. 2B is a partly sectional view illustrating the state of the solenoid valve when a direction of magnetic flux generated by the coil opposes that of magnetic flux generated by a permanent magnet.

When current supplying circuit 200 supplies current to coil 23 in one way so that a direction of magnetic flux generated by the coil becomes opposite to a direction of magnetic flux generated by permanent magnet 27, the attraction force F1 to attract movable core 26 on the stationary core 24 side decreases comparing to the attraction force F1 during non-excitation of coil 23 as shown in FIGS. 2A and 2B. As a result, a position of movable core 26 is further apart from stationary core 24 than a position thereof during non-excitation of coil 23 and contact portion 41a moves in a second direction in which contact portion 41a of valve member 41 approaches seat portion 11a to close ISC valve 10. When contact portion 41a of valve member 41 makes contact with seat portion 11a, air channel 60 is closed.

Figure 2C:
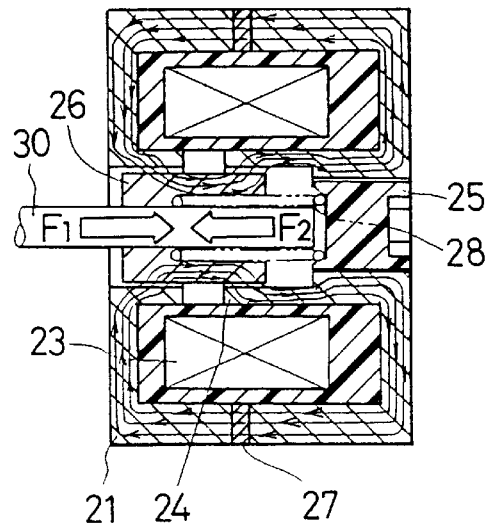
FIG. 2C is a partly sectional view illustrating the state of the solenoid valve when the direction of magnetic flux generated by the coil is the same as that of magnetic flux generated by the permanent magnet.

When current supplying circuit 200 supplies current to coil 23 in the other way so that magnetic flux generated by coil 23 comes into the same direction as that of magnetic flux generated by permanent magnet 27, attraction force F1 to attract movable core 26 on stationary core 24 side increases as shown in FIG. 2C. As a result, movable core 26 is attracted closer to stationary core 24 than during non-excitation of coil 23 and contact portion 41a moves in a first direction in which contact portion 41a of valve member 41 moves further apart from seat portion 11a. In this case, because the clearance between contact portion 41a and seat portion 11a is made large, the flow rate of air flowing through air channel 60 increases more than the flow rate of air during non-excitation of coil 23.

As described above, current supplying circuit 200 adjusts a value and a direction of current to be supplied to coil 23. As a result, a lift position of movable core 26 can be controlled, and intake air having a flow rate corresponding to the lift position of movable core 26 flows through air channel 60. It is to be noted that current supplying circuit 200 is mainly composed of four transistors connected to form an H-shaped bridge circuit; for example, a drive circuit disclosed in U.S. patent application Ser. No. 08/501,188 can be adopted as current supplying circuit 200. Therefore, U.S. patent application Ser. No. 08/501,188 is incorporated herein by reference.

The effect of the first embodiment will be described with comparison to a comparative example illustrated in FIG. 4.

Figure 3:
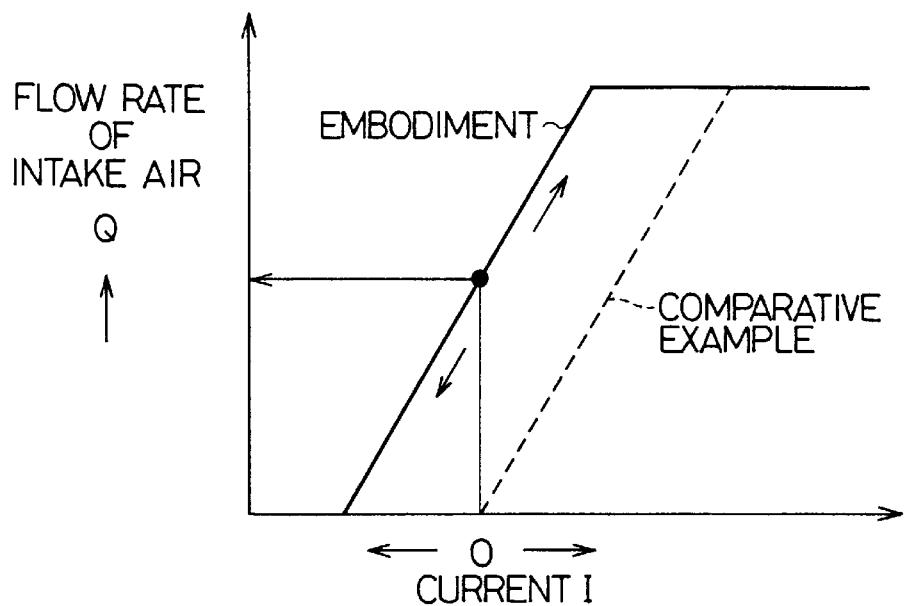
FIG. 3 is a graph showing a relationship between flow rate of intake air and current supplied to the coil with respect to the first embodiment and a comparative example.
Figure 4:
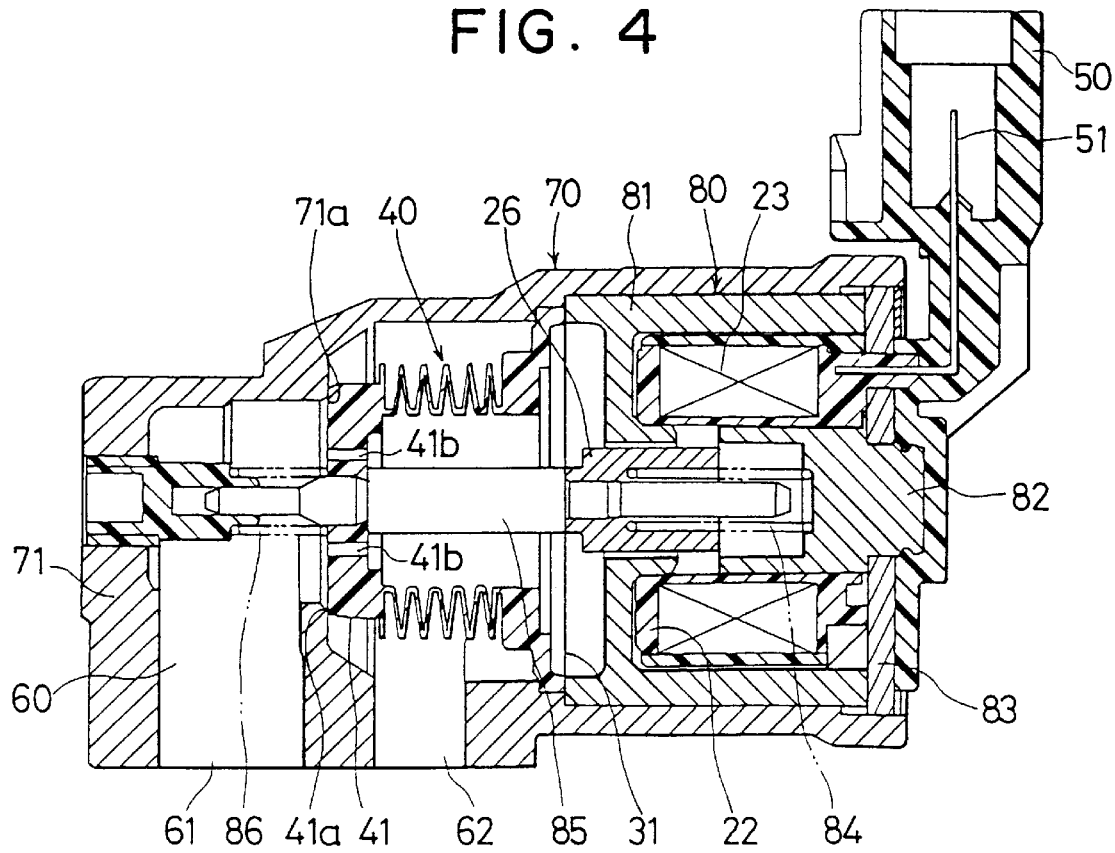
FIG. 4 is a sectional view illustrating an ISC valve of the comparative example.

In an ISC valve 70 shown in FIG. 4, a permanent magnet is not disposed in a magnetic circuit constituted by a yoke 81, a stationary core 82, plate 83 and movable core 26. Movable core 26 is press-fitted to a shaft 85. A valve member 41 of a bellows 40 is fixed to one end of shaft 85. Accordingly, shaft 85 moves back and forth together with movable core 26 and valve member 41 of bellows 40. Movable core 26 is biased by a spring 84 so that valve member 41 closes an air channel 60. Further, valve member 41 is biased by a spring 86 so that valve member 41 opens air channel 60. Because the biasing force of spring 84 is set to be greater than that of spring 86, a contact portion 41a of valve member 41 makes contact with a seat portion 71a formed in an inner wall of housing 71, and so air channel 60 is closed. Therefore, in the comparative example shown in FIG. 4, if coil 23 cannot generate magnetic force to attract movable core 26 on a stationary core 82 side due to failure of a current supplying circuit (not shown), breaking of coil 23 or the like, contact portion 41a remains in contact with to seat portion 71a. As a result, because the flow rate of intake air introduced in an engine becomes nearly zero as shown in FIG. 3, the engine stops.

If the biasing force of spring 86 is set to be greater than that of spring 84, contact portion 41a can be separated from seat portion 71a during non-excitation of coil 23. In this case, however, even if current is supplied to coil 23 in two ways, magnetic force generated by coil 23 simply acts movable core 26 to attract movable core 26 on a stationary core 82 side. This is because and even if a direction of magnetic flux generated by coil 23 is changed, movable core 26 is magnetized by magnetic flux of coil 23 so that movable core 26 is attracted on the stationary core 82 side. As a result, in the comparative example, if the biasing force of spring 86 is set to be greater than that of spring 84, it is impossible to close air channel 60 by causing contact portion 41 to make contact with seat portion 71a.

In the first embodiment, permanent magnet 27 disposed in yoke 21 generates magnetic flux to attract movable core 26 on a stationary core 24 side irrespective of excitation or non-excitation of coil 23. Magnetic force to attract movable core 26 and biasing force to press movable core 26 are adjusted so that contact portion 41a is spaced by a predetermined distance from seat portion 11a during non-excitation of coil 23, thereby enabling intake air having a predetermined flow rate to flow through air channel 60. Additionally, current supplying circuit 200 supplies current to coil 23 in two ways. When current supplying circuit 200 supplies to coil 23 in one way so that a direction of magnetic flux generated by coil 23 becomes opposite to a direction of magnetic flux generated by permanent magnet 27, i.e., magnetic flux of permanent magnet 27 is reduced by magnetic flux of coil 23, magnetic force to attract movable core 26 on the stationary core 24 side is weakened. As a result, contact portion 41a can make contact with seat portion 11a, and so air channel 60 can be closed.

Further, in the comparative example shown in FIG. 4, when supply of current to ISC valve 70 becomes "off" in response to the stoppage of the engine, if environmental temperature of the engine is low, contact portion 41a can be frozen to seat portion 71a, thereby causing malfunction of ISC valve 70. Conversely, in the first embodiment shown in FIG. 1, when supply of current to ISC valve 10 becomes "off" in response to the stop of the engine, because valve member 41 stays apart from seat member 11a, valve member 41 can be prevented from freezing to seat member 11a.

Moreover, because permanent magnet 27 is disposed in yoke 21, it is possible to make movable core 26 lightweight. As a result, stoppage response of movable core 26 to a change of magnetic force applied thereto can be enhanced, and so accurate flow rate control can be performed.

(Second Embodiment)

Figure 5:
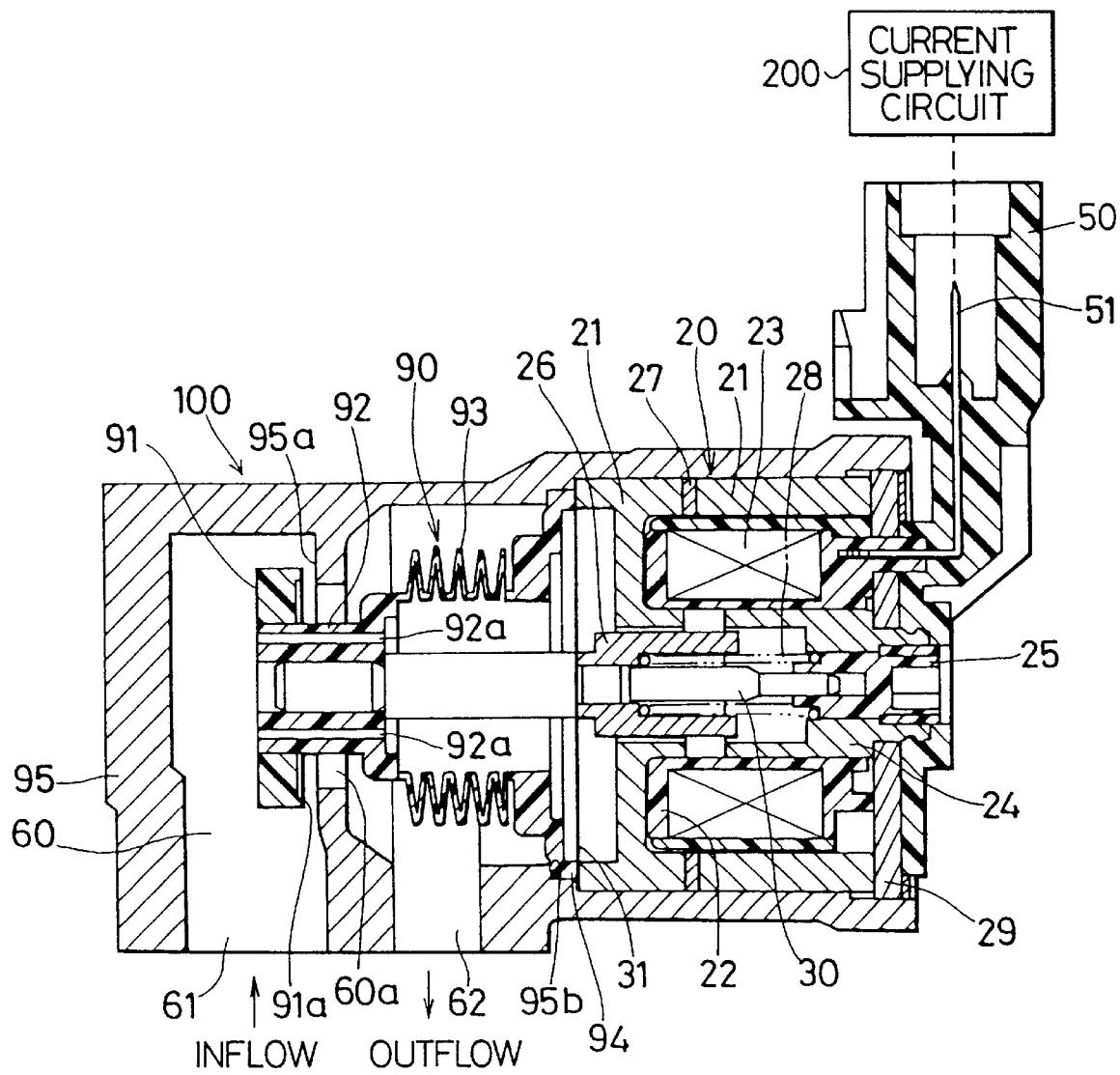
FIG. 5 is a sectional view illustrating a solenoid valve according to a first embodiment of the present invention, the solenoid valve being applied to an ISC valve.

The second embodiment of the present invention is shown in FIG. 5. Incidentally, the same figures as used in the first embodiment are given to substantially the same parts as the first embodiment.

A bellows 90 is composed of a valve member 91, a connecting member 92, a bellows portion 93 and a flange member 94. Connecting member 92 connects valve member 91 and bellows portion 93 placed at both sides of a seat portion 95a. A peripheral portion of flange member 94 of bellows 90 is put, along with plate spring 31, between yoke 21 and a stepped portion 95b formed in an inner wall of housing 95.

A contact portion 91a of valve member 91 is capable of making contact with a seat portion 95a formed in the inner wall of housing 95. The inside of bellows 90 and an inflow port 61 side of air channel 60 are connected by through holes 92a formed in connecting member 92.

Biasing force of spring 28 is applied to movable core 26 so that a contact portion 91a moves further apart from seat portion 95a. Magnetic force of permanent magnet 27 is applied to movable core 26 so that movable core 26 is attracted on a stationary core 24 side, i.e., contact portion 91a makes contact with seat portion 95a.

Next, operation of ISC valve 100 will be described.

During non-excitation of coil 23, movable core 26 is held at a position shown in FIG. 5 due to balance of attraction force (magnetic force) heading for a stationary core 24 side, and biasing force which is given by spring 28 to move movable core 26 further apart from stationary core 24. At this time, contact portion 91a separates from seat portion 95a. Therefore, intake air flows in air channel 60 from inflow port 61 to outflow port 62 via a clearance between contact portion 91a and seat portion 95a during non-excitation of coil 23. As a result, even when coil 23 cannot generate magnetic flux due to the failure of current supplying circuit 200, breaking of coil 23 or the like, it is possible to supply intake air to the engine and thereby to prevent stop of the engine.

When current supplying circuit 200 supplies current to coil 23 in one way so that a direction of magnetic flux generated by coil 23 becomes opposite to a direction of magnetic flux generated by permanent magnet 27, the attraction force to attract movable core 26 on the stationary core 24 side decreases compared to the attraction force during non-excitation of coil 23. As a result, a position of movable core 26 is apart from stationary core 24 than a position thereof during non-excitation of coil 23 and contact portion 91a moves in a second direction in which contact portion 91a of valve member 91 moves further from seat portion 95a to open ISC valve 10. In this case, because the clearance between contact portion 91a and seat portion 95a is made large, the flow rate of air flowing through air channel 60 increases more than the flow rate of air during non-excitation of coil 23.

When current supplying circuit 200 supplies current to coil 23 in the other way so that magnetic flux generated by coil 23 flows in the same direction as that of magnetic flux generated by permanent magnet 27, the attraction force to attract movable core 26 on the stationary core 24 side increases. As a result, movable core 26 is attracted more closely to stationary core 24 than during non-excitation of coil 23 and contact portion 91a moves in a first direction in which contact portion 91a of valve member 91 approaches seat portion 95a. When contact portion 91a of valve member 91 makes contact with seat portion 91a, air channel 60 is closed.

As described above, current supplying circuit 200 adjusts a value and a direction of current to be supplied to coil 23. As a result, a lift position of movable core 26 can be controlled, and intake air having a flow rate corresponding to the lift position of movable core 26 flows through air channel 60.

In the second embodiment, a position of movable core 26 is determined based on the balance of biasing force of spring 28 and magnetic force of permanent magnet 27 which act to movable core 26 in directions opposing each other during non-excitation of coil 23. As a result, even when coil 23 is not excited, contact portion 91a of valve member 91 stays apart by a predetermined distance from seat portion 95a, and so air channel 60 is opened. Consequently, even if current cannot be supplied to coil 23 due to breaking of the coil or the like, contact portion 91a of valve member 91 can be prevented from contacting seat portion 95a, and intake air having a predetermined flow rate can flow through air channel 60 to provide the engine for intake air. Therefore, the idling operation of the engine goes on even in the above situation.

In addition, even when supply of current to ISC valve 100 becomes "off" in response to the stoppage of the engine, because valve member 91 stays apart from seat member 95a, valve member 91 can be prevented from freezing to seat member 95a.

Further, current supplying circuit 200 can supply current to coil 23 in two ways. Therefore, not only the flow rate of intake air flowing through air channel 60 can be controlled, but also air channel 60 can be closed by ISC valve 100. Further, because coil 23 is composed of a single coil, size of ISC valve 100 can be made small.

In the second embodiment as well, permanent magnet 27 is disposed in not the movable member but in yoke 21 constituting the magnetic circuit. As a result, because the weight of the movable member can be lightened, response of the movable member is enhanced so that control of the flow rate of intake air can be accurately performed. Further, because the volume of permanent magnet 27 can be made large without increasing the size of electromagnetic actuator 20, a great deal of magnetic force can be obtained from permanent magnet 27.

In the first and second embodiments, biasing force of spring 28 can be adjusted by changing an amount of screwing of adjusting screw 26. Therefore, even though there are processing errors or manufacturing errors of the solenoid valve, variations due to the errors can be compensated by the adjusting screw 26 and the lift position of valve member 41, 91 can be easily controlled Further, in the first and second embodiments, the solenoid valve according to the present invention is applied to the ISC valve which controls the flow rate of intake air flowing through the intake air bypass during the idling operation of the engine. However, not limited to this, the solenoid valve according to the present invention can be also applied to a valve having another use if the valve is required to open a fluid channel during non-excitation of the coil.

In the first and second embodiments, although permanent magnet 27 is disposed in yoke 21 as the stationary member, permanent magnet 27 can be mounted on movable core 26 as the movable member. Further, permanent magnets may be respectively provided to both yoke 21 and movable core 26. In this case, the permanent magnets can apply magnetic force to movable core 26 so that not only movable core 26 is attracted on the stationary core 24 side but also movable core moves further apart from stationary core 24.

What is claimed is:

1. A solenoid valve apparatus comprising:
    a seat portion provided in a fluid channel;
    a movable member including a valve member which closes said fluid channel when making contact with said seat portion, and opens said fluid channel when separating from said seat portion;
    a stationary member including a coil, which constitutes a magnetic circuit along with said movable member;
    a permanent magnet disposed in said magnetic circuit constituted by said movable member and said stationary member, which generates magnetic force to attract said movable member on a stationary member side, said magnetic force generated by said permanent magnet being applied to said movable member through said stationary member;
    a biasing member which provides said movable member with biasing force of which a direction is opposite to a direction of magnetic force generated by said permanent magnet;
    a current supplying circuit for selectively supplying current to said coil in a first direction and in a second direction opposite said first direction,
    wherein said valve member is apart from said seat portion by a predetermined distance due to balance of magnetic force generated by said permanent magnet and biasing force provided by said biasing member so that said fluid channel is opened when said current supplying circuit does not supply current to said coil, said valve member moves to approach said stationary member when said current supplying circuit supplies current to said coil in said first direction so that said coil generates magnetic force of which a direction is the same as said direction of magnetic force generated by said permanent magnet, and said valve member moves further apart from said stationary member when said current supplying circuit supplies current to said coil in said second direction so that said coil generates magnetic force of which a direction is opposite to said direction of magnetic force generated by said permanent magnet.

2. A solenoid valve apparatus according to claim 1, wherein said coil is composed of single coil.

3. A solenoid valve apparatus according to claim 1, wherein said permanent magnet is disposed in said stationary member constituting said magnetic circuit.

4. A solenoid valve apparatus according to claim 1, wherein said stationary member comprises:
    a cylindrical bobbin on which said coil is wound;
    a stationary core disposed on an inner peripheral surface of said cylindrical bobbin;
    a yoke disposed on an outer peripheral surface of said cylindrical bobbin; and
    a plate provided to cover one bottom face of said cylindrical bobbin,
    said permanent magnet is disposed in said yoke.

5. A solenoid valve apparatus according to claim 1, further comprising an adjusting member for adjusting said biasing force of said biasing member.

6. A solenoid valve apparatus according to claim 1, wherein said solenoid valve apparatus is used to control an idling speed of an engine.

7. A solenoid valve apparatus according to claim 1, wherein said valve member makes contact with said seat portion when said movable member moves to approach said stationary member.

8. A solenoid valve apparatus according to claim 1, wherein said valve member makes contact with said seat portion when said movable member moves further apart from said stationary member.

9. A solenoid valve apparatus comprising:
   a seat portion provided in a fluid channel;
   a movable member including a valve member which closes said fluid channel when making contact with said seat portion, and opens said fluid channel when separating from said seat portion;
   a stationary member for constituting a magnetic circuit along with said movable member, the stationary member including
      a coil,
      a cylindrical bobbin on which said coil is wound,
      a stationary core disposed on an inner peripheral surface of said cylindrical bobbin,
      a yoke disposed on an outer peripheral surface of said cylindrical bobbin, and
      a plate provided to cover one bottom face of said cylindrical bobbin;
   a permanent magnet disposed in said yoke, which generates magnetic force to attract said movable member on a stationary member side;
   a biasing member which provides said movable member with biasing force of which a direction is opposite to a direction of magnetic force generated by said permanent magnet;
   a current supplying circuit which selectively supplies current to said coil in a first direction and in a second direction opposite the first direction,
   wherein said valve member is apart from said seat portion by a predetermined distance due to a balance of magnetic force generated by said permanent magnet and biasing force provided by said biasing member so that said fluid channel is opened when said current supplying circuit does not supply current to said coil, said valve member moves to approach said stationary member when said current supplying circuit supplies current to said coil in said first direction so that said coil generates magnetic force of which a direction is the same as said direction of magnetic force generated by said permanent magnet, and said valve member moves further apart from said stationary member when said current supplying circuit supplies current to said coil in said second direction so that said coil generates magnetic force of which a direction is opposite to said direction of magnetic force generated by said permanent magnet.

10. A solenoid valve apparatus according to claim 9, further comprising
   an adjusting member for adjusting said biasing force of said biasing member.

11. A solenoid valve apparatus according to claim 9, wherein said solenoid valve apparatus is used to control an idling speed of an engine.

12. A solenoid valve apparatus according to claim 9, wherein said valve member makes contact with said seat portion when said movable member moves to approach said stationary member.

13. A solenoid valve apparatus according to claim 9, wherein said valve member makes contact with said seat portion when said movable member moves further apart from said stationary member.

14. A solenoid valve comprising:
   a seat portion provided in a fluid channel;
   a moveable member including a valve member which closes said fluid channel when making contact with said seat portion, and opens said fluid channel when separating from said seat portion;
   a stationary member including a coil, which constitutes a magnetic circuit along with said moveable member;
   a permanent magnet disposed in said magnetic circuit which generates magnetic force to attract said movable member on a stationary member side, said magnetic force generated by said permanent magnet being applied to said movable member through said stationary member; and
   a biasing member which provides said movable member with biasing force of which a direction is opposite to a direction of magnetic force generated by said permanent magnet so that said valve member is apart from said seat portion by a predetermined distance due to balance of magnetic force generated by said permanent magnet and biasing force provided by said biasing member during non-excitation of said coil,
   wherein said valve member approaches said stationary member when said coil generates magnetic force of which a direction is the same as said direction of magnetic force generated by said permanent magnet, and said valve member moves further apart from said stationary member when said coil generates magnetic force of which a direction is opposite to said direction of magnetic force generated by said permanent magnet.

* * * * *